United States Patent [19]

Constantinescu et al.

[11] Patent Number: 4,484,711

[45] Date of Patent: Nov. 27, 1984

[54] SHOWER HEAD ADAPTED TO STOP AND TO ALLOW THE FLOW OF MIXED WATER

[76] Inventors: Spiridon Constantinescu; Serban Constantinescu, both of 30 Golders Green Ave., Scarborough, Ontario, Canada, M1C 3P6

[21] Appl. No.: 540,891

[22] Filed: Oct. 11, 1983

Related U.S. Application Data

[62] Division of Ser. No. 257,545, Apr. 27, 1981, Pat. No. 4,427,177.

[51] Int. Cl.³ .............................................. B05B 1/18
[52] U.S. Cl. ................................... 239/460; 239/574; 239/586
[58] Field of Search ................................ 239/456–460, 239/569, 574, 583, 586, 587, 590–590.5

[56] References Cited

U.S. PATENT DOCUMENTS 4,273,289  6/1981  Jette ................................ 239/460 X
4,273,292  6/1981  Neula .............................. 239/574 X Primary Examiner—Andres Kashnikow

[57] ABSTRACT

A shower head having improved housing and shank and having also a valve inside, activated by a front knob. The flow of mixed water through the shower head being stopped or allowed for convenient and for economical reasons in the course of a shower bath by pulling or pushing the front knob.

1 Claim, 2 Drawing Figures

SHOWER HEAD ADAPTED TO STOP AND TO ALLOW THE FLOW OF MIXED WATER

This application is a divisional application of application Ser. No. 06/257,545 filed Apr. 27, 1981, now U.S. Pat. No. 4,427,177.

BACKGROUND OF THE INVENTION

Generally the flow of mixed water through showerheads is not controlled and the stream of mixed water inconveniences the course of a shower bath or it runs wasting the hot water which in case of small water heaters diminishes the number of shower baths in a short time.

This invention pertains to a device mounted inside a regular shower head which beside the arrangement of the flow of mixed water is able to stop or to allow the stream of water by pulling or pushing a knob provided in front of the shower head.

The principal object of invention is to provide a shower control which uses rationally the stream of mixed water being simply manipulated by the person who takes the shower.

A further object of invention is to provide a method for taking a shower in which important quantities of energy and water can be saved.

A further object of invention is to provide a method for taking a shower using strictly the hot necessary water mainly where small water heaters are installed, therefore making possible the taking of maximum number of shower baths using the hot water of one tank capacity.

DETAILED DESCRIPTION

Figure 1:
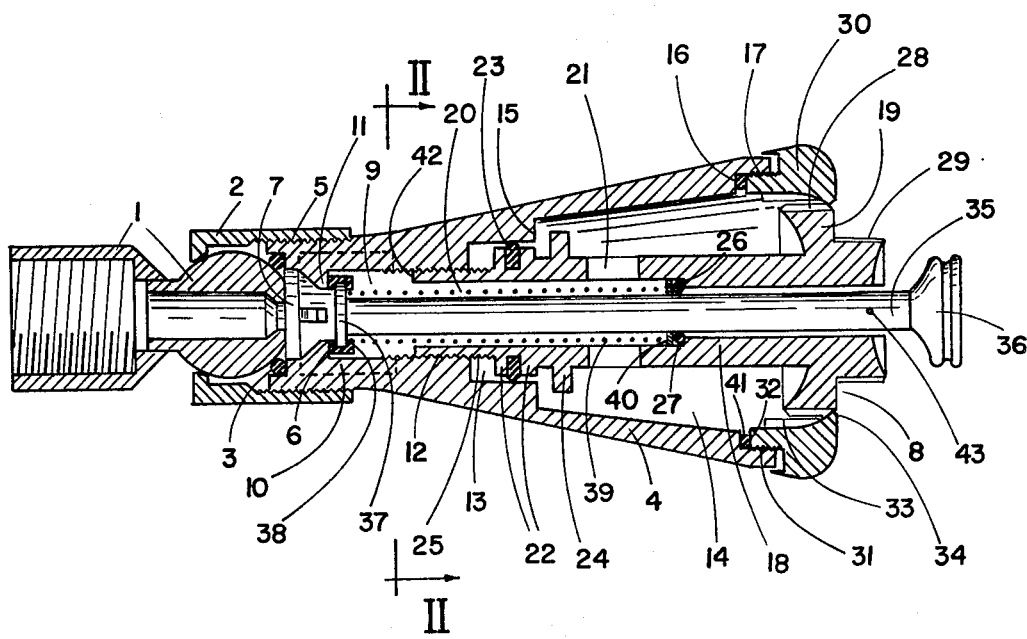
FIG. 1, is a sectional view through a shower head provided with a shower control.
Figure 2:
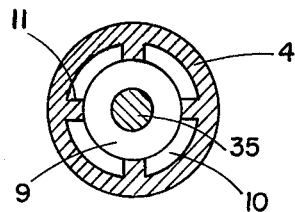
FIG. 2, is a section of the line II—II of FIG. 1.

Referring to the drawings wherein, the shower control is built inside a shower head as in FIG. 1 where the ball-nut 1, the ball fitting nut 2 and the sealing ring 3 are known means for connecting, for rotating, and for sealing a shower head to a shower arm. The housing 4 is fixed to ball fitting nut 2 by thread means 5. Inside housing 4 are: a flow opening therethrough as main chamber 14 including inlet 7 and outlet 8, valve chamber 9 with its minimum three by-passes 10 separated by hooked ribs 11—hooked ribs 11 forming axial circular stop 6—, thread means 12, cylindrical portion 13, annular seat 15, annular seat 16 and thread means 17. The jet adjuster is mushroom shaped and has: shank 18, cap 19, axial cylindrical opening 20, slots 21, exterior annular groove 22, elastomeric seal ring 23, stopper 24, thread means 25, annular seat 26 and a plurality of perimetrical grooves 28. The housing plug 30 has thread means 31, annular seat 32, a plurality of perimetrical grooves 33 and rim 34. Spindle 35 has: knob 36, valve 37, and U shaped seal ring 38. Knob 36 is fixed inside spindle 35 by means of pin 43.

This shower head works as follows: spring 39 pushes permanently valve 37 onto axial circular stop 6 when the shower is off from the mixer; when the mixer is turned on, the way of mixed water is through inlet 7, along by-passes 10, through axial cylindrical opening 20, through slots 21, inside main chamber 14, and between grooves 28 and 33 reaching outlet 8. The connection between housing 4 and housing plug 30 is sealed by seal ring 41 tightened between annular seats 16 and 32 by thread means 17 and 31. The contact between shank 18 and spindle 35 is sealed by seal ring 27 pushed against annular seat 26 by washer 40 in permanent contact with spring 39. The jet of mixed water can be adjusted by turning ribbed cylinder 29, then cap 19 with grooves 28 turns and slides guided by grooves 33 and also elastomeric seal ring 23 guided by exterior annular groove 22 seals cylindrical portion 13 of main chamber 14 so that the stream of mixed water can reach the main chamber only through bores 21. When the jet of mixed water is to be stopped, knob 36 has to be pulled. Then, valve 37 with its U shaped seal ring 38 contacts seat 42 of shank 18. The stream presses valve 37 against seat 42 and the axial cylindrical opening 20 remains closed because spring 39 is made weaker than water pressure. When the jet of mixed water is necessary again, pushing knob 36 the way through axial cylindrical opening 20 becomes free and the stream through slots 21 and main chamber 14 is on. If the stream of mixed water is off from the mixing faucet, the pressure of water over valve 37 ceases to exist and spring 39 opens the way through axial cylindrical opening 20 reestablishing the normal state for the shower head. The axial movement of jet adjuster is limited toward the inside by annular seat 15 and stopper 24, and toward the outside by rim 34.

What we claim is:

1. In a shower head including means for connecting, for rotating, and for sealing said shower head into a shower arm, which shower arm receives a flow of mixed water from a mixer; a housing having a flow opening therethrough consisting of an inlet, a main chamber and an outlet, said housing having also a first thread means at the inner end matching with said connecting means, a second thread means inside, and a third thread means at the outer end; a shank having a fourth thread means at the inner end matching with said second thread means and a cap at the outer end, and said shank having also perimetrical grooves disposed around said cap for adjusting the jet of flow of mixed water and having also a ribbed cylinder at the outer end for shifting said shank and said grooves; a housing plug for locking said shank inside said housing and having a fifth thread means matching with said third thread means, and having also sealing means between said housing plug and said housing; the improvement comprising, in combination, an interior controller for stopping or opening the flow of mixed water, wherein, as part of said controller:

(a) said housing includes
 (1) a few by-passes, at least three, for diverting the flow of mixed water and being disposed peripherically between said inlet and said main chamber;
 (2) hooked ribs disposed between said by-passes and shaping into an axial circular stop;
 (3) a cylindrical sealing portion placed between said second thread means and said main chamber;
 (4) a first annular seat placed between said cylindrical sealing portion and said main chamber; and
 (5) a valve chamber placed between said hooked ribs and said cylindrical sealing portion;
(b) said shank including
 (1) an axial cylindrical opening;
 (2) a few slots placed between said axial cylindrical opening and said main chamber;

(3) an exterior annular groove and an elastomeric seal ring inside said exterior annular groove, for sealing the space between said improved shank and said improved housing on said cylindrical sealing portion;
(4) a stopper placed between said exterior annular groove and said slots, for stopping the screwing of said shank onto said first annular seat;
(5) a second annular seat at the inner end of said improved shank; and
(6) a third annular seat placed inside said axial cylindrical opening between said slots and said cap;
(c) a spindle mounted inside said axial cylindrical opening, said spindle having (1) a valve at the inner end of said spindle, said valve moving between said axial circular stop and said second annular seat;
(2) a knob mounted at the outer end of said spindle by means of a pin; and
(3) a U seal ring mounted around said valve;
(d) sealing means having a second elastomeric seal ring and a washer placed around said spindle and pressing permanently onto said third annular seat and around said spindle, said sealing means sealing the remaining space between said improved shank and said spindle;
(e) a compressible spring around said spindle placed between said valve and said washer for keeping said valve open when the flow of mixed water has been turned off by said mixer.

* * * * *